Figure 1:
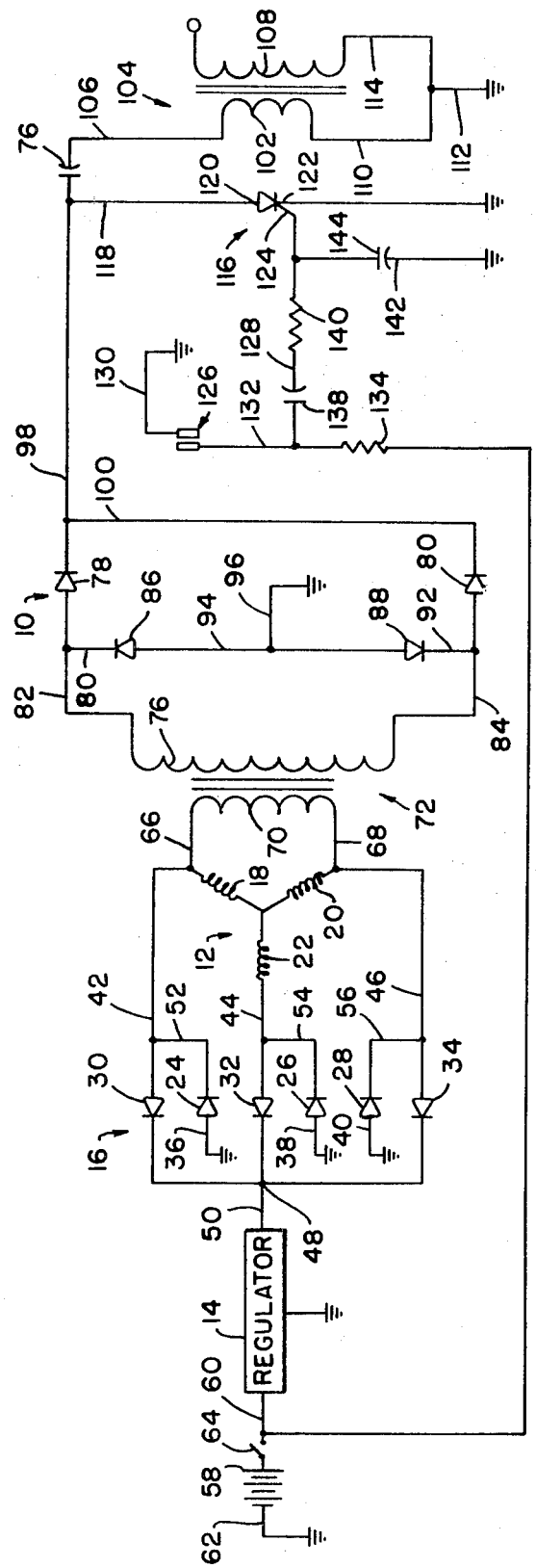

United States Patent
Plume, Jr.

[15] 3,646,605
[45] Feb. 29, 1972

[54] CAPACITOR-DISCHARGE IGNITION SYSTEM FOR INTERNAL COMBUSTION ENGINES

[72] Inventor: Alfred Plume, Jr., Carson City, Nev.
[73] Assignee: Mallory Electric Corporation, Detroit, Mich.
[22] Filed: Oct. 29, 1969
[21] Appl. No.: 872,306

[52] U.S. Cl.........................................123/148 E, 123/149
[51] Int. Cl..........................................................F02p 3/06
[58] Field of Search..........................123/148; 310/107, 112

[56] References Cited

UNITED STATES PATENTS

| | | | |
|---|---|---|---|
| 3,331,986 | 7/1967 | Hardin | 123/148 |
| 3,356,896 | 12/1967 | Shano | 315/209 |
| 3,358,665 | 12/1967 | Carmichael | 123/148 |
| 3,465,739 | 9/1969 | Burson | 123/149 |
| 3,517,655 | 6/1970 | Saulmes | 123/148 |
| 3,496,920 | 2/1970 | Shano | 123/148 |

OTHER PUBLICATIONS

1968 Ford Manual, Section 13-4

Primary Examiner—Mark M. Newman
Assistant Examiner—Ronald B. Cox
Attorney—Whittemore, Hulbert & Belknap

[57] ABSTRACT

The capacitor-discharge ignition system is for use in connection with internal combustion engines which employ an alternator. The alternator functions in the usual manner to provide operating power for the electrical system usually associated with an internal combustion engine. A capacitor-discharge ignition circuit is connected across one phase of the output of the alternator in parallel with the usual electrical system. The alternator is utilized directly as a source of power for operation of the capacitor-discharge ignition system.

2 Claims, 2 Drawing Figures

PATENTED FEB 29 1972 3,646,605

INVENTOR.
ALFRED PLUME JR.

BY Wittemore
Hulbert & Belknap
ATTORNEYS

CAPACITOR-DISCHARGE IGNITION SYSTEM FOR INTERNAL COMBUSTION ENGINES

BACKGROUND OF THE INVENTION

Single-phase and three-phase alternators have come into widespread use to replace the conventional DC generators utilized in vehicle electrical systems. Conventionally, the output of such alternators has been rectified and the alternator output has been controlled by means of a voltage regulator to charge a battery. The output of the battery has been utilized to operate various electrical components in the vehicle and to operate the ignition system. In the past, it has not been possible to utilize the output of the alternator directly to operate the vehicle ignition system. Efficiency of operation of the vehicle would be improved and the cost of the ignition system reduced if it were possible to so directly use the alternator output to operate the ignition system. In accordance with the present invention, circuitry is provided which permits use directly of the alternator output to operate the ignition system.

SUMMARY OF THE INVENTION

A capacitor-discharge ignition system for internal combustion engines is provided. The system comprises an alternator having an output which is at least one phase. A first circuit is connected to the output of the alternator. The first circuit includes a rectifier circuit, a voltage regulator and a DC power source. A second capacitor-discharge ignition circuit is connected to one phase of the output of the alternator. The second circuit is in parallel with the first circuit.

Figure 2:
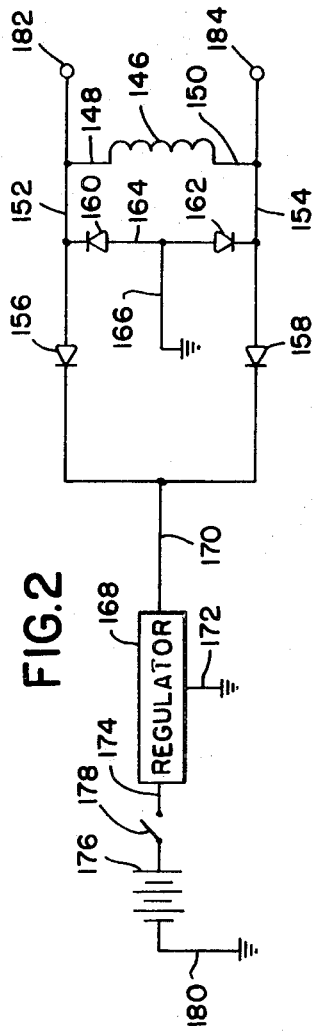

In the drawing:

FIG. 1 is an electrical schematic view of one embodiment of the present invention; and FIG. 2 is an electrical schematic view of another embodiment of the present invention.

Referring first to the embodiment illustrated in FIG. 1, it will be noted that the capacitor-discharge ignition system 10 has a power supply which includes an alternator 12. The alternator 12 is of the conventional type utilized in many current automobile models. Such alternators are composed of the same operating parts as the conventional DC generator but they function differently. The field is called a rotor and is the turning portion of the unit. A generating part, called a stator, is the stationary member, comparable to the armature in a DC generator. A voltage regulator 14, similar to those used in a DC system, regulates the output of the alternator system.

As is conventional with alternators, current is transmitted from the field terminal of the regulator 14 through a slipring to the field coil of the alternator and back to ground through another slipring. The strength of the field regulates the output of the alternating current. This alternating current is transmitted from the alternator to a rectifying system 16 where it is converted to direct current.

The alternator 12 employs a three-phase stator winding, comprising windings 18, 20, 22, in which the windings 18, 20, 22 are electrically 120° apart. The rotor usually consists of a field coil encased between interleaved sections producing a magnetic field with alternate north and south poles. By rotating the rotor inside the stator, the alternating current is induced in the stator windings.

The alternating current is rectified by silicone diodes provided in the rectifying system 16. Six silicone diode rectifiers 24, 26, 28, 30, 32, 34 are provided. Three of the diodes 24, 26, 28 are grounded at 36, 38, 40. Each of the other three diodes 30, 32, 34 is connected to the output terminal of a winding 18, 20, 22 via leads 42, 44, 46. These leads are connected at a common point 48 to a lead 50 which extends to the regulator 14. A lead 52, 54, 56 extends from each of the diodes 24, 26, 28 into connection with a lead 42, 44, 46 between the diodes 30, 32, 34 and the windings 18, 20, 22. The rectifying system 16 thus described is a full wave rectifier circuit. The output of the alternator is connected to a vehicle battery 58 via lead 60. One side of the battery 58 is grounded at 62 as is conventional. A switch 64, which may be the conventional ignition switch, is provided in lead 60. A regulated output voltage, usually of 14 volts, may be tapped off at the battery 58.

Leads 66, 68 extend from the output terminals of two of the windings 18, 20 and each is connected to one side of primary winding 70 of a step-up transformer 72. Bridging of the windings 18, 20 provides a single-phase output to the primary winding 70.

The secondary winding 74 of the transformer 72 is connected to a rectifier circuit which rectifies the output thereof and supplies the output to one side of a capacitor 76 which forms part of the capacitor-discharge ignition system 10.

The rectifying system for the transformer 72 is a full wave rectifying circuit. Each side of the secondary winding 74 of the transformer 72 is connected to the positive terminal of a junction diode 78, 80 via leads 82, 84. A second pair of diodes 86, 88 are provided. The negative terminals of diodes 86, 88 are connected to leads 82, 84 via leads 90, 92. The positive terminals of diodes 86, 88 are interconnected by lead 94 and a common ground 96 is provided. The negative terminal of diode 78 is connected to the capacitor 76 via lead 98. A lead 100 extends from the negative terminal of diode 80 into connection with lead 98 to thus complete the full wave rectifying circuit.

The other side of the capacitor 76 is connected to one side of primary winding 102 of step-up output transformer 104, which may be the conventional coil of an ignition system, via lead 106. The transformer 104 provides a voltage sufficiently high to fire a spark plug of a vehicle engine. The transformer 104 comprises the primary winding 102 and a secondary winding 108. The high voltage output of the winding 108 is utilized for firing the vehicle spark plugs.

A lead 110 extends from one side of the primary winding 102 and is connected to a ground lead 112. A lead 114 extends from one side of secondary winding 108 into connection with a common ground lead 112.

A solid-state controlled rectifier 116 is provided in a lead 118 which extends between ground and the lead 98. The rectifier, which may be a silicone-controlled rectifier, has an anode 120, a cathode 122 and a gate 124. As is well known, a controlled rectifier is a solid-state four-layer device. In its normal state, the controlled rectifier acts as an open circuit that will not pass current. When an appropriate voltage or current is applied to the gate electrode, it will cause the controlled rectifier to be forward biased to permit current flow. Application of the proper polarity voltage to the controlled rectifier will allow electrons to flow from the cathode to the anode. Reversal of the voltage polarity results in the controlled rectifier being an open circuit. Similarly, when the controlled rectifier is conducting, application of a reverse polarity to the gate electrode will place the controlled rectifier in its original state of an open circuit. Thus, the controlled rectifier can act as a controlled switching diode capable of being switched on or off by application of voltages of appropriate polarity.

In the present embodiment, the gate 124 is connected to conventional breaker points 126 via lead 128. One side of the points 126 is connected to ground via lead 130 while the other side is connected to the battery 58 via lead 132. A load resistor 134 is provided in lead 132. The lead 128 extends from the lead 132 to the gate 124. A capacitor 138 and resistor 140 are provided in lead 128. A lead 142 extends from the lead 128 to ground. A capacitor 144 is provided in lead 142.

The capacitors 138, 144 and resistor 140 function as a filter circuit and shape the wave resulting from opening and closing of the points 126 to provide a sharp start and cutoff of the controlled rectifier 116.

Operation of the circuit may now be understood. With the ignition switch 64 closed to apply battery voltage to the system, the alternator 12 generates a supply voltage which is stepped up by the transformer 72. The stepped-up voltage may be, for example, in the neighborhood of 250 volts. This voltage is rectified and causes capacitor 76 to be charged.

When the points 126 are closed, thus applying a signal to the gate 124 of the controlled rectifier 116, the controlled rectifier is turned on and current flows through the anode-cathode circuit thereof. When the controlled rectifier conducts, it acts as a virtual short circuit causing the capacitor 76 to rapidly discharge through the primary winding 102 of the transformer 104. The voltage applied to the primary winding 102 of the transformer rises to the full capacitor voltage in a very short period of time, from 1 to 3 microseconds. The voltage is induced in the secondary winding 108 sufficient to cause firing of a vehicle spark plug.

After the capacitor 76 has discharged, the magnetic field of the primary winding 102 collapses. The field in the transformer eventually decays to return the system to the original condition.

Upon collapse of the field, conduction of the controlled rectifier is discontinued by the reverse voltage applied to the anode-cathode circuit upon charging of the capacitor 76 to the opposite voltage upon collapse of the field in the transformer 104. The excitation applied to the gate is also discontinued at this time by opening of the points 126 so that the rectifier will not again begin conducting until such time as the entire circuit is again ready for a new firing cycle.

FIG. 2 illustrates an embodiment in which a single-phase alternator is utilized rather than a three-phase alternator. The single-phase alternator 146 has a single winding. Such alternators are used in connection with small engines such as two-cycle piston-type engines. A permanent magnet may provide the field for the alternator 146. Leads 148, 150 extend from the output of alternator 146 into connection with leads 152, 154. Full wave rectification is provided for the alternator output. The rectifying circuit includes four silicone diodes 156, 158, 160, 162. Two of the diodes 156, 158 are provided in the leads 152, 154. The other two diodes 160, 162 are provided in a lead 164 which extends between the leads 152, 154. A common ground 166 is provided intermediate the diodes 160, 162.

A regulator 168 is connected to the alternator and rectifying circuit by lead 170. The regulator is grounded at 172. A lead 174 connects the regulator to a conventional vehicle battery 176. A switch 178, such as the conventional ignition switch, is provided in the lead 174. The battery 176 is grounded at 180 as is conventional.

The output of the alternator is taken off at contact points 182, 184 which are connected to opposite sides of the primary winding 70 of transformer 72 as illustrated in FIG. 1. The remainder of the circuit is as described in connection with FIG. 1.

In the FIG. 2 embodiment, the output of the alternator 146 is subjected to full wave rectification by the circuit comprising the diodes 156, 158, 160, 162. The regulator 168 controls operation of the alternator as described in connection with FIG. 1.

A novel aspect of both the FIG. 1 and FIG. 2 embodiments resides in the fact that the load represented by the ignition circuit and the load represented by the regular battery circuit, with any power tapped off for other vehicle needs, are essentially in parallel with respect to the output of the alternators. This arrangement permits use of the ignition circuit in connection with standard vehicle electrical systems. The ignition system may be directly installed in vehicles as a replacement for a standard ignition system or it may be installed as original equipment in the vehicle. In either case, the system does not require extensive modification or replacement of the standard alternator or of other electrical circuitry in the vehicle electric system.

What I claim as my invention is:

1. A capacitor-discharge ignition system for internal combustion engines comprising an alternator having an output which is multiphase, a first circuit connected to the entire output of the alternator, said first circuit including a rectifier circuit, a voltage regulator and a DC power source, and a second capacitor-discharge ignition circuit connected to one phase only of the output of the alternator, said second circuit being in parallel with said first circuit, said second circuit comprising a first step-up transformer having primary and secondary windings, the primary winding of said first step-up transformer being connected across said one phase of the output of the alternator, a rectifier circuit connected to the output of said first step-up transformer, a capacitor connected to the output of said rectifier circuit to be charged thereby, a second step-up transformer having primary and secondary windings, said capacitor in series with the primary winding of said second transformer, and discharge means to discharge the capacitor through the primary winding of said second transformer in timed sequence with an operating engine to induce a voltage in the secondary winding of said second transformer sufficient to fire a spark plug.

2. A capacitor-discharge ignition system as defined in claim 1, and further characterized in that said alternator is a three-phase alternator, said second circuit being connected across one phase only of the alternator.

* * * * *